Nov. 23, 1965   R. B. BRINDLEY ETAL   3,218,918
PHOTOCOPYING MACHINE
Filed April 28, 1961   7 Sheets-Sheet 1
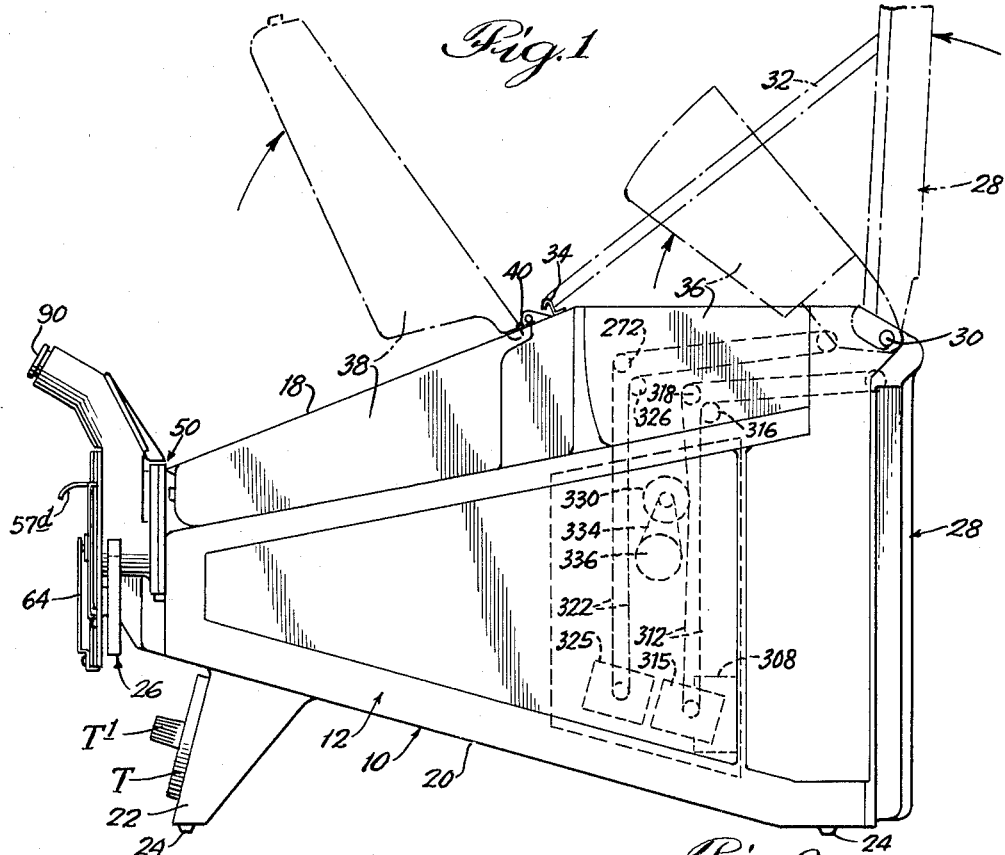
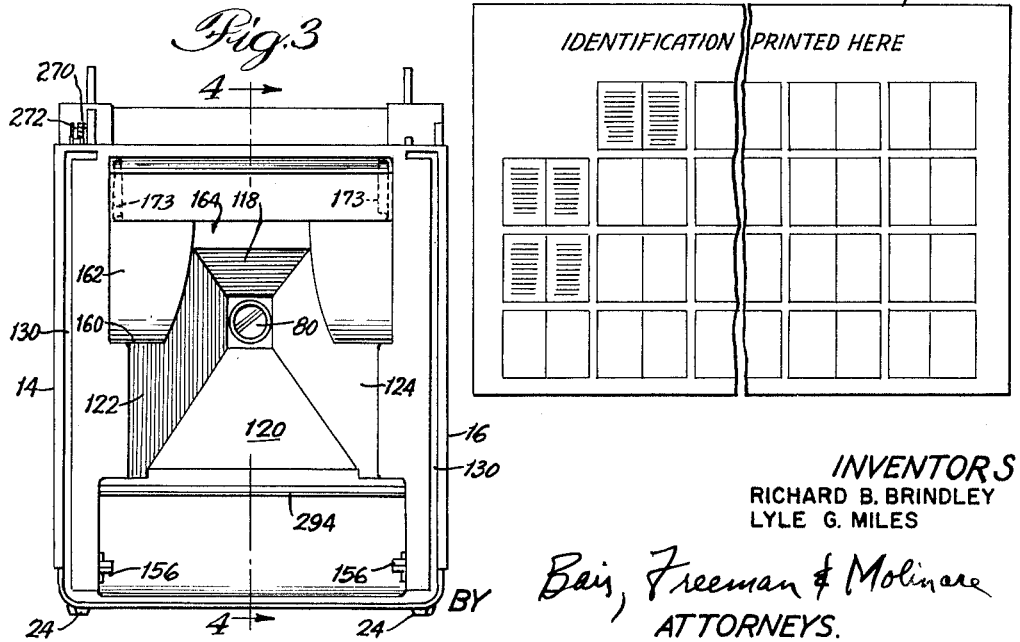
INVENTORS
RICHARD B. BRINDLEY
LYLE G. MILES
BY Bair, Freeman & Molinare
ATTORNEYS.

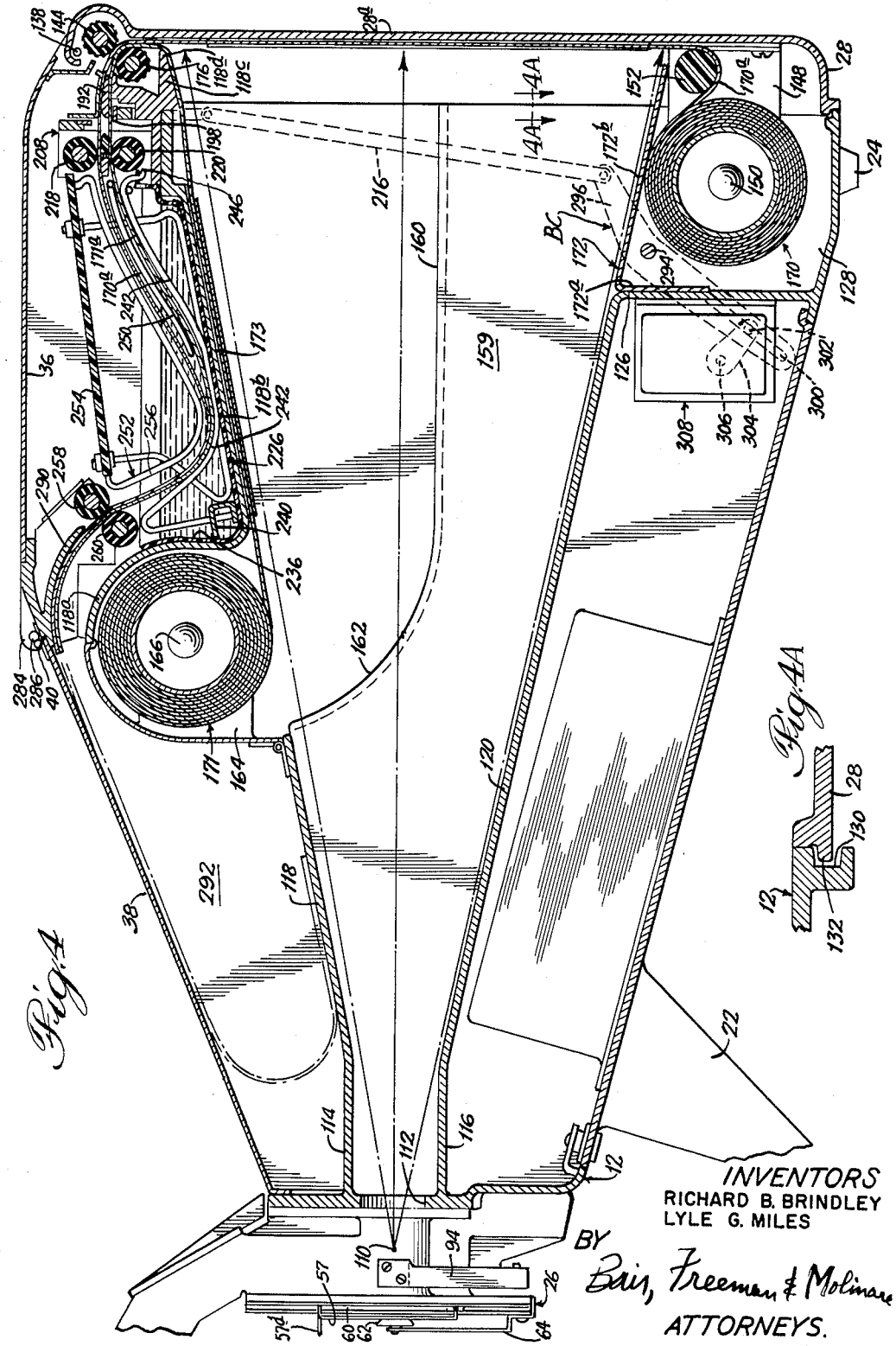

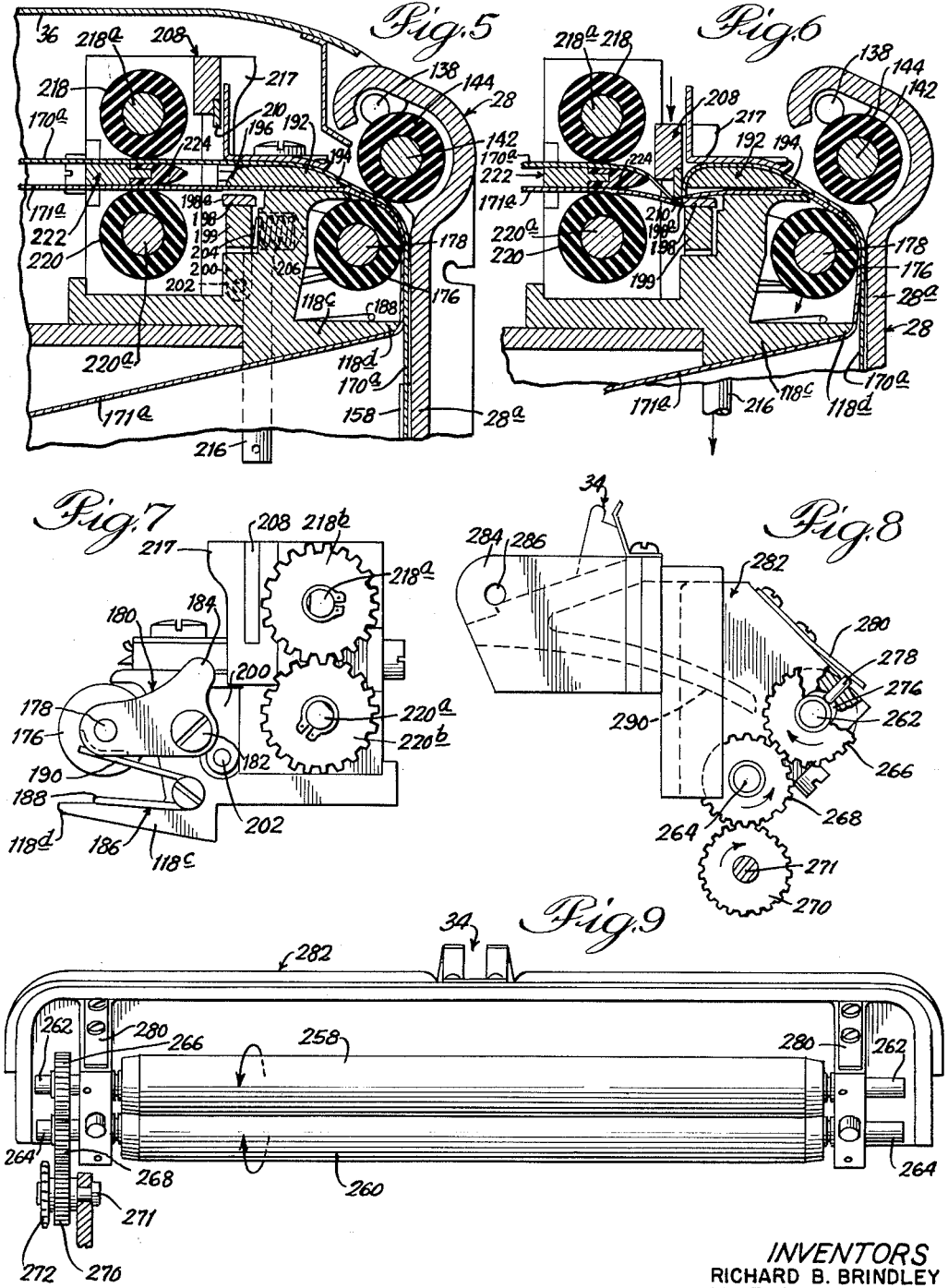

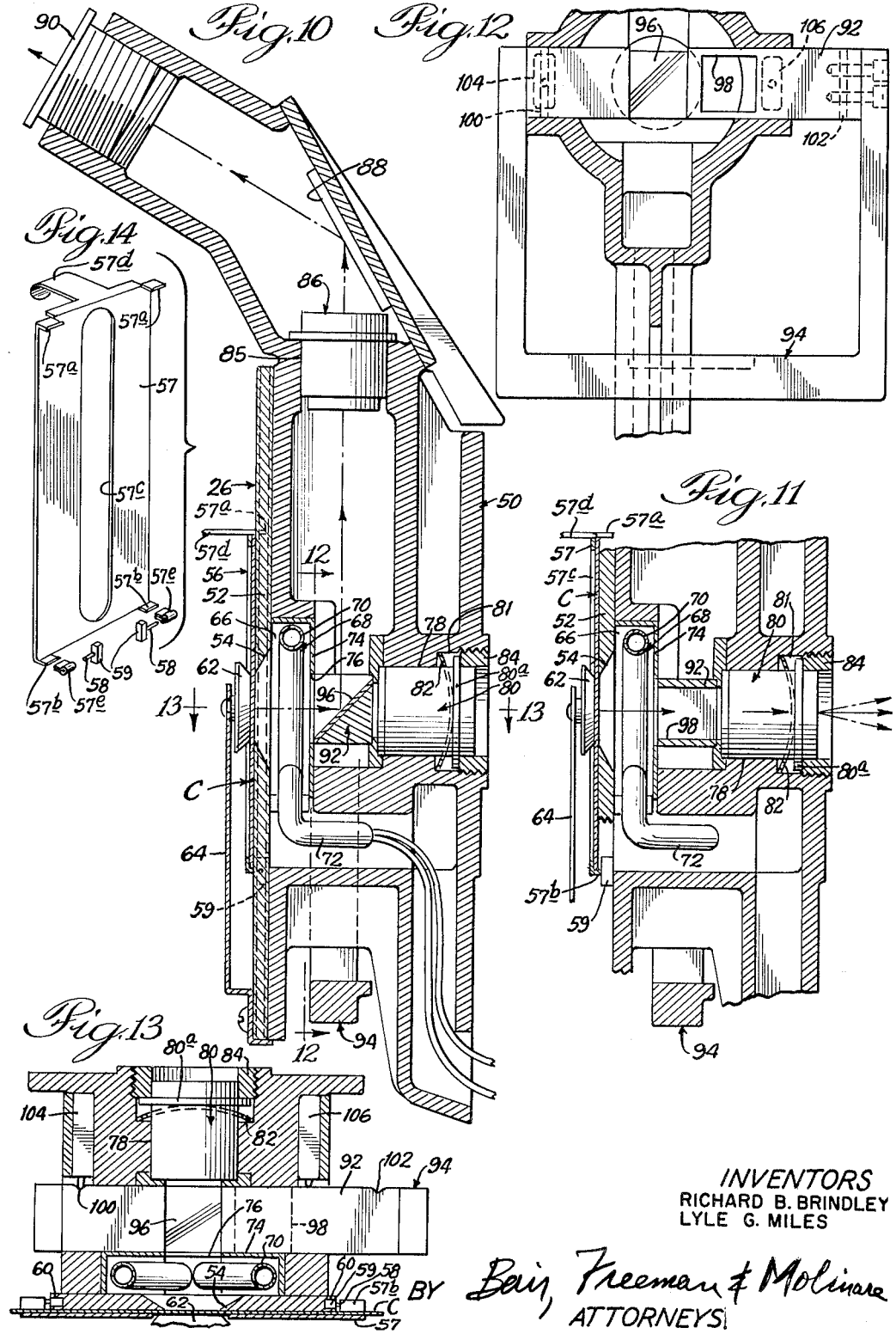

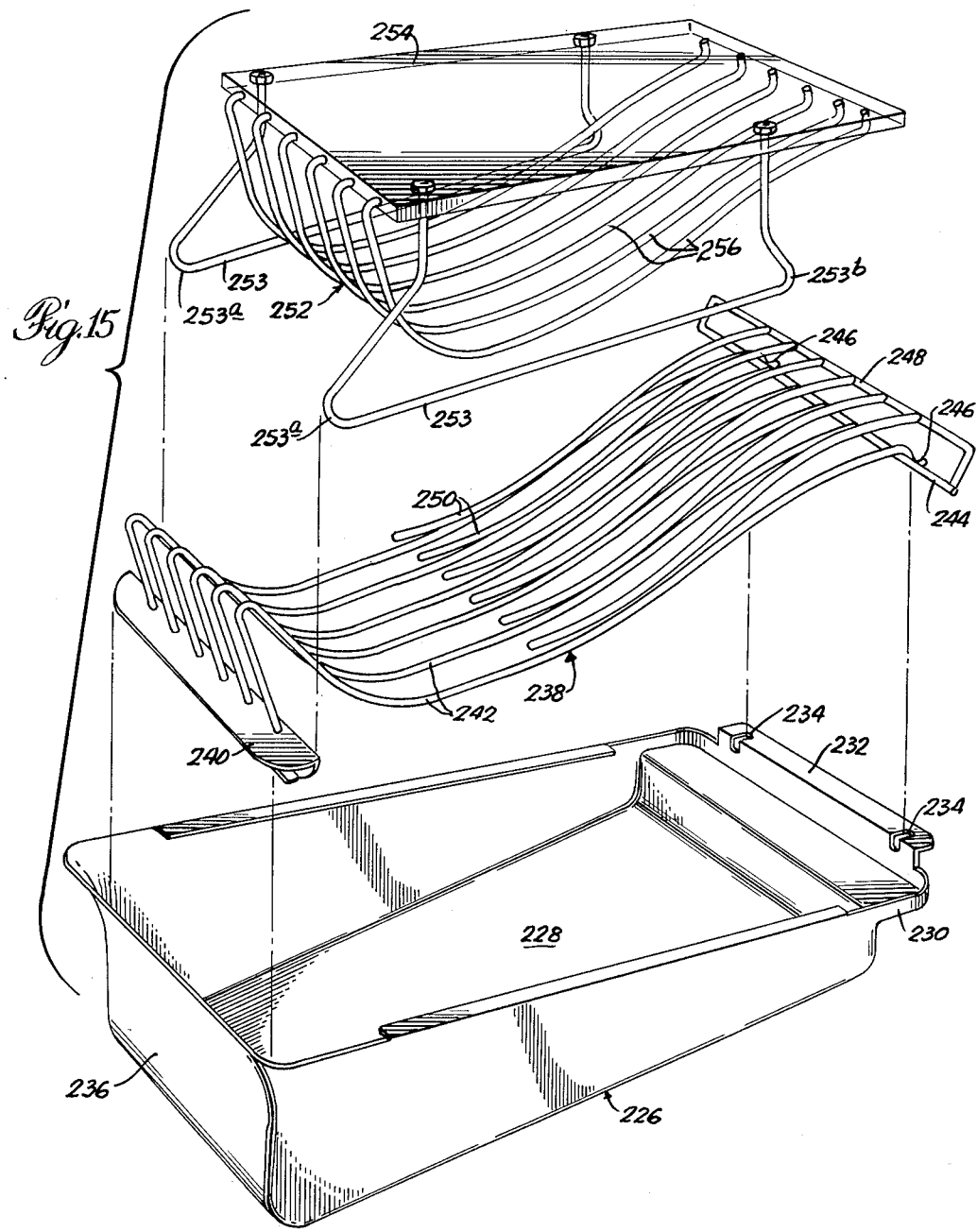

Nov. 23, 1965
R. B. BRINDLEY ETAL
3,218,918
PHOTOCOPYING MACHINE
Filed April 28, 1961
7 Sheets-Sheet 6
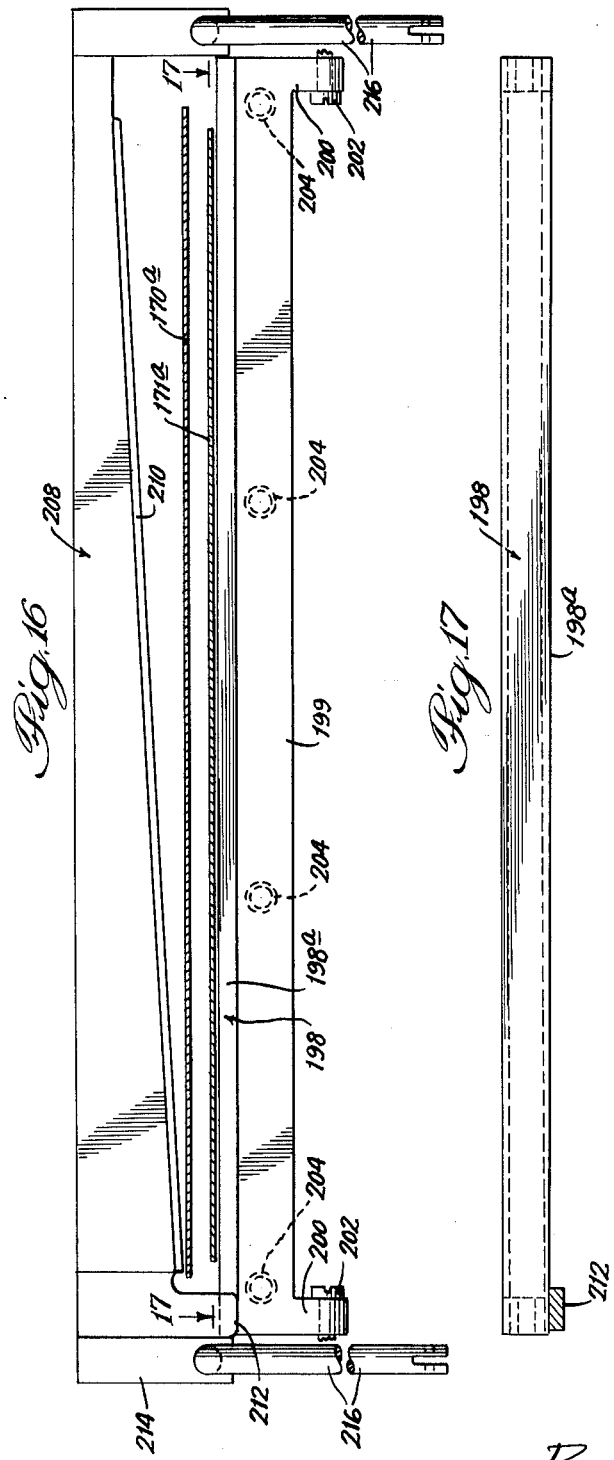
INVENTORS
RICHARD B. BRINDLEY
LYLE G. MILES
BY Bair, Freeman & Molinare
ATTORNEYS.

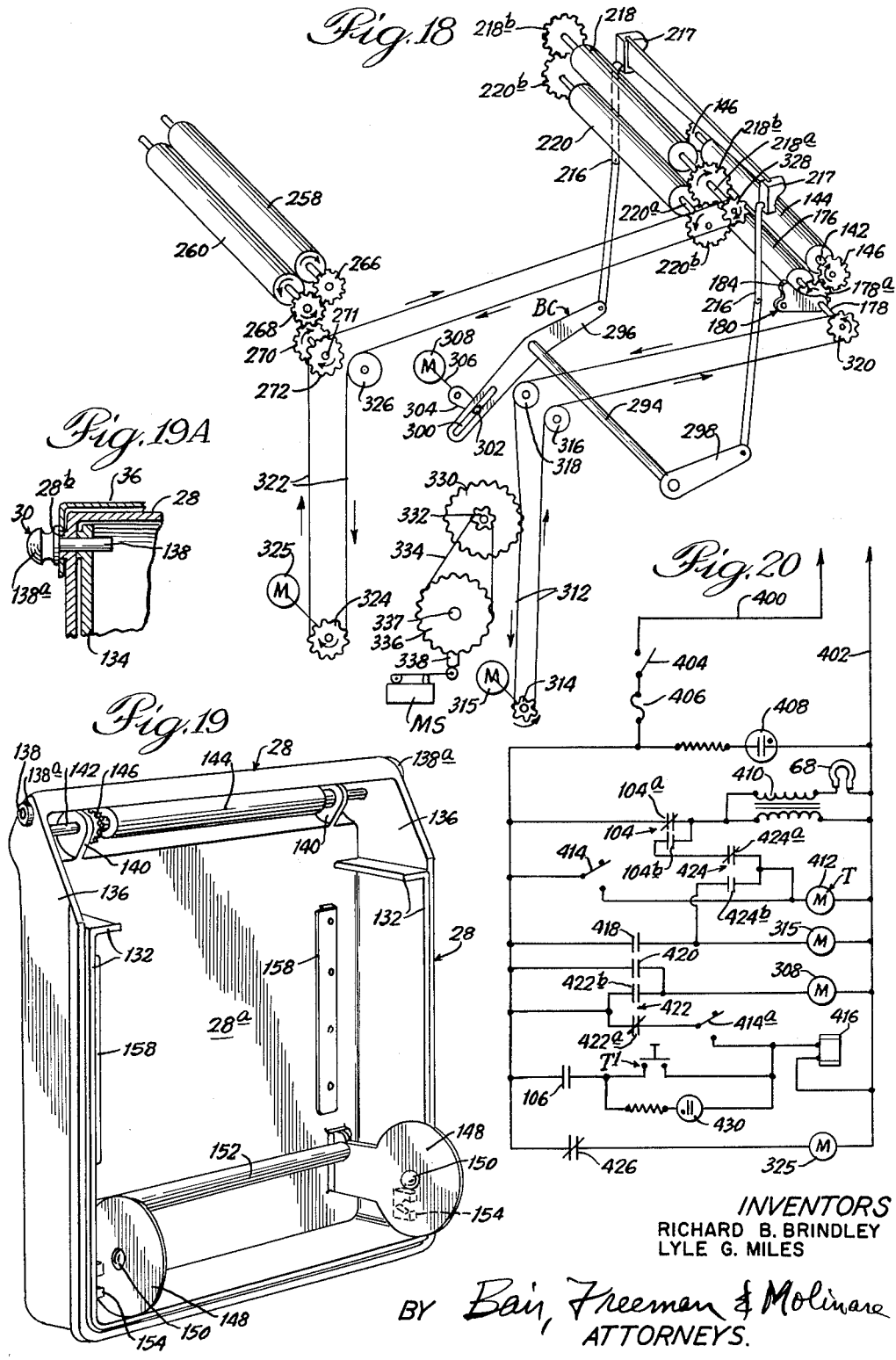

_United States Patent Office_

3,218,918
Patented Nov. 23, 1965

3,218,918
PHOTOCOPYING MACHINE
Richard B. Brindley, La Crosse, and Lyle G. Miles, West Salem, Wis., assignors to Microcard Reader Corporation, West Salem, Wis., a corporation of Wisconsin
Filed Apr. 28, 1961, Ser. No. 106,250
16 Claims. (Cl. 88—24)

This invention relates to a photocopying machine and more particularly relates to (1) a machine for enlarging a microphotograph and for making a photocopy of the enlarged image of the microphotograph, and (2) a machine for providing continuous rolls of positive and negative photocopy paper with which to make individual photocopies as desired.

An increasing amount of reference material is today being supplied in the form of microphotographs reproduced on cards or films. Frequently the researcher desires to immediately reproduce in enlarged size the microphotograph that he is at that moment viewing. Heretofore, no machine has been capable of providing in a very short-time enlarged-size photocopies of microphotographs that are being viewed.

Thus, one object of this invention is to provide a single machine for both viewing microphotographs, and for enlarging the desired microphotograph to effect making of a photocopy of the enlarged image.

Another object of this invention is to provide a machine which will automatically enlarge a selected microphotograph and will copy the enlarged image to produce a normal reading-size copy of the microphotograph within a very brief period of time.

A further object of this invention is to provide a library-type machine that permits of normal examining of microphotographic reference records and which permits of simple and rapid photocopy type reproducing of selected microphotographs in enlarged form for normal reading use.

Photocopy machines have heretofore required use and manipulation of individual sheets of negative and positive paper with the original document being copied in order to effect the necessary copying from the original document. The use of rolls of negative and positive paper would, of course, reduce the amount of individual sheet manipulation heretofore required.

Thus, still another object of this invention is to provide a photocopy machine having elongated rolls of negative and positive paper from which individual photocopies are produced in an automatic operation.

In any production of photocopies it is essential to expose a sensitized negative sheet to an image of the original, then to dispose a positive sheet in facing relation to the negative sheet, and to then provide a liquid interface under squeezing pressure between the negative and positive sheets to effect development of a transfer image on the positive sheet. Many machines have been devised to effect the said series of steps in two or more discrete and separate operations on individual negative and positive sheets. Any attempt to make such a process automatic by using continuous rolls of positive and negative paper involves complexities in each of the said steps of effecting an exposure of the negative, bringing together the positive and negative sheets, segmenting the adjacent positive and negative sheets from the rolls, and providing a liquid interface between the sheets under squeezing pressure.

Thus, a further object of this invention is to provide an automatic photocopy machine which avoids the aforesaid problems and which automatically provides singly and in combination for (1) segregated and confined exposure of only a segment of negative paper from a roll thereof, (2) coordinated joint advance of spaced web segments of positive and negative paper from continuous rolls thereof into facing juxtaposition, (3) separating of the exposed negative sheet segment from its corresponding positive sheet segment to insure obtaining a liquid interface therebetween, (4) severing the respective paper segments from the continuous webs thereof, and (5) effecting automatic movement of the webs or sheets through a bath and then subjecting the webs or sheets to a squeezing pressure to produce a typical photocopy product. In the actual machine, portions of the webs or sheets will be both in the bath and between the squeeze rollers before severing occurs.

And another object of this invention is to provide for improved feeding and severing means for automatically feeding and advancing a plurality of webs simultaneously and for severing the webs simultaneously when in spaced-apart relation.

And a further object of this invention is to provide improved bath means and sheet guide means for cooperation with sheets of negative and positive paper in a photocopy process.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawings, in which:

FIGURE 1 is a side elevation view of one form of an enlarging and photocopying machine that embodies the invention, with FIGURE 1 illustrating how certain portions of the machine casing are swingable to alternate positions;

FIGURE 2 is a fragmental plan view of a typical opaque, microphotograph-bearing card that may be used with the machine of FIGURE 1;

FIGURE 3 is a view looking into the machine of FIGURE 1, which is looking from the right of FIGURE 1, with the back cover panel removed to expose the interior of the machine;

FIGURE 4 is an enlarged cross-section view taken substantially on line 4—4 of FIGURE 3 but with the back cover panel in position on the machine;

FIGURE 4A is an enlarged fragmentary cross-section view taken on line 4A—4A of FIGURE 4, and illustrates the light trap construction between the casing and the back cover;

FIGURE 5 is an enlarged fragmentary cross-section view of the roller means for advancing the positive and negative paper of the photocopying portion of the machine of FIGURE 4, and this figure shows the paper-severing means in a retracted position;

FIGURE 6 is a fragmentary cross-section view of a portion of FIGURE 5, but shows the paper-severing means in action operating to sever advanced segments of the positive and negative paper from the web supplies of such paper;

FIGURE 7 is an elevational view taken looking in the direction opposite to the directions of views of FIGURES 5 and 6 and shows the cam means associated with the swingable roller of a pair of feed rollers for cooperation with the paper-severing blade for separating the rollers after severing has occurred to permit the positive and negative sheets to be re-aligned;

FIGURE 8 is a fragmentary elevational view with portions broken away showing the gearing for the squeeze rollers between which rollers pass the positive and negative sheets as they leave the developing bath;

FIGURE 9 is a fragmentary elevational view of the squeeze rollers of FIGURE 8 and is taken looking from the right of FIGURE 8;

FIGURE 10 is an enlarged vertical axial cross-section view of the viewing means, the card illuminating means, and lens means of the machine of FIGURES 1 and 4, and showing the parts in position when the card is being viewed;

FIGURE 11 is a fragmentary view of a portion of FIGURE 10 but showing certain parts in alternative position when the machine is being used to enlarge the image on the card for photocopying purposes;

FIGURE 12 is a fragmentary cross-section view taken substantially on line 12—12 of FIGURE 10;

FIGURE 13 is a fragmentary cross-section view taken substantially on line 13—13 of FIGURE 10;

FIGURE 14 is a perspective exploded view of a portion of the card-retaining mechanism shown in FIGURE 10;

FIGURE 15 is an enlarged perspective exploded view of the bath means and paper guide means associated therewith;

FIGURE 16 is a fragmentary enlarged elevational view of the paper-severing blade and anvil and is taken looking from the left when viewed in FIGURE 5;

FIGURE 17 is a plan view of the anvil of the severing means and is taken on line 17—17 of FIGURE 16;

FIGURE 18 is a perspective diagrammatic view of the drive means for the paper and severing means of this machine;

FIGURE 19 is a perspective view of the interior of the back cover for the machine;

FIGURE 19A is a fragmentary cross-section view of the pivotal mounting means for the cover; and FIGURE 20 is a wiring diagram showing the electrical control for the machine.

Referring now to the drawings, the photocopying machine of this invention is shown in FIGURE 1, generally indicated at 10, and said machine includes a hollow, light-excluding casing 12 having lateral outer sides 14 and 16, an inclined top 18, and an inclined bottom 20. The casing 12 is supported on front legs 22 which also carry a timer T and a pair of rearward supports 24. Attached to the front of casing 12 (the front being the left-hand side of FIGURE 1) is a microphotograph viewing and illuminating means, generally indicated at 26.

The hollow interior of the casing 12 is accessible through a rear door 28, which is pivotally mounted on casing 12 by means of a pair of axially spaced, but aligned, pins 30. The rear door 28 may be swung to an open position, as indicated in dot-dash lines in FIGURE 1, and said door carries a bracing arm, shown in dot-dash lines at 32, which has a headed end that is adapted fon selective engagement with a bifurcated stud 34 that is normally carried on a top portion of the casing 12. The upper side of the casing 12 is subdivided, as hereinafter described, to define a photocopy-developing station and a photocopy-receiving station. A cover 36 is provided pivotally mounted on rear door 28 coaxially of pins 30, and which cover 36 may be swung to the dot-dash line position seen in FIGURE 1, to provide access into said developing station. A cover 38 is hingedly mounted at 40 and may be swung to the dot-dash line position shown in FIGURE 1 to provide access into said receiving station.

It will be understood that the purpose of the viewing and illuminating means 26 is to permit of either viewing of a selected microphotograph, or of illuminating the selected microphotograph so as to permit the image thereof to be projected for a predetermined time period through the hollow casing 12 to an exposure station at which a web segment of highly-light-sensitive negative paper is exposed. After an exposure has been effected, the segment of exposed negative paper and a complementary segment of less-light-sensitive positive paper are then advanced into the developing station that is overlain by cover 36, where the exposed negative paper and the positive paper are immersed into a chemical bath which effects development of the image that has been projected from the microphotograph. The sheets or segments of negative and positive paper are then passed through pressure rollers to form a photocopy sandwich of negative and positive paper, which sandwich is then deposited into the receiving station, where access to the sandwich is had by raising the cover 38.

Having thus briefly described the general purpose of the entire machine of FIGURE 1, reference is now had to FIGURES 10 to 14, which disclose the details of the viewing and illuminating means 26. The viewing and illuminating means 26 includes a frame member generally indicated at 50, which carries thereon a vertical abutment plate 52 against which a microphotograph bearing card C is thrust, in both the viewing and copying position. The plate 52 is provided with a central aperture 54, the shape of which is frusto-conical, as seen in FIGURE 10, with the small dimension of aperture 54 at the exterior of the plate 52. A microphotograph bearing card C is held against abutment plate 52 by a card holder generally indicated at 56. The card holder 56 includes a vertical plate 57 having rearwardly turned upper spaced pair of flanges 57a and lower pair of flanges 57b, and between which flanges the card C is positioned. The plate 57 is provided with a vertically elongated slot 57c, and the upper end of plate 57 has a laterally extending finger gripping element 57d. The spaced flanges 57a and 57b are disposed laterally outwardly of abutment plate 52; and flanges 57b connect to hinge pintles 57e which are pivotally mounted on outwardly extended pins 58, carried by slide-blocks 59 of a plastic material sold under the trademark Nylon or the like which are positioned for sliding in vertically elongated grooves 60 defined in the upright lateral edges of the abutment plate 52. This arrangement permits of selective movement of the card holder 56 in vertical directions, to move selected vertical portions of the card C into alignment with the aperture 54. The card may be selectively moved laterally between plate 57 and plate 52. A frusto-conical card presser plate 62 is carried at the extended end of an elongated cantilevered leaf spring 64 that is secured to the lower end of plate 52. The reduced tip of pressure plate 62 is dimensioned to extend through slot 57c, and the pressure plate 62 engages the portion of the card C that is directly opposite the aperture 54, so as to maintain the face of the card at a precise location, relative to certain optical means hereinafter described.

The frame 50 is shaped to define an interior recess 66, in which is positioned a fluorescent illuminating lamp generally indicated at 68 and which includes a torus illuminating ring 70 that connects to a laterally extending mounting 72. The internal dimension of the lamp torus 70 is one inch in diameter, and the thickness of the torus is between 0.7 and 0.8 mm. The size of the torus 70 is greater than the beveled aperture 54 and the portion of the card to be illuminated thereby, so as to provide a peripheral illumination, of substantially uniform intensity, concentrically of the portion of the card that is disposed centrally in the aperture 54. The positioning of the lamp 70 immediately closely adjacent the plate 52 serves to provide uniform intensity in the light being reflected from the card C.

A light shield 74 is provided in recess 66 and is arranged so that the light torus 70 is disposed between the shield 74 and the aperture 54. The shield 74 has a central opening 76 that is coaxial of aperture 54 and is of reduced size relative to the dimension of torus 70 and relative to the larger dimension of aperture 54. This provides a centrally disposed aperture which prevents light glaring directly from torus 70 through aperture 76, while permitting the reflected light from card C to pass directly through opening 76. The frame 50 is apertured at 78, axially spaced from aperture 54, and is adapted to receive therein an optical means, such as a focusing lens cartridge, generally indicated at 80. An enlarged recess 81 surrounds lens 80, and a dished annular spring 82 is disposed in recess 81 in engagement with one side of flange 80a of the lens cartridge. An adjustable, screw-threaded, annular plug 84 cooperates with the other side of flange 80a, against the bias of spring 82, to accurately locate the lens 80 as may be required.

The frame 50 is also provided with a bore 85 in which is positioned a second lens cartridge 86 whose optical axis is transverse to the optical axis of lens 80. The frame 50 carries a mirror 88, which serves to reflect the light passing through lens 86 in the manner as illustrated by the dot-dash arrow, so that the reflected image may be selectively seen through an optical eye piece 90 that is adjustably screwed into an upwardly and outwardly extending tubular portion of frame 50, at best seen in FIGURES 1 and 10.

An elongated shutter member, generally indicated at 92, is provided, having connected to the ends thereof a U-shaped control 94 that extends outwardly of frame 50 to provide for ease of manual manipulation of the shutter member. The shutter member 92 carries thereon a mirror 96 which is disposed at an angle of forty-five degrees relative to the axis of lens 86, which is arranged to reflect the image from card C through lens 86 for viewing through eye piece 90. Spaced laterally of mirror 96 is an aperture 98, which extends through shutter member 92, and which when axially aligned with lens 80 serves to pass the reflected light from card C through aperture 98 and through lens 80 for optical cooperation with the photocopying paper within casing 12 as hereinafter described.

The shutter member 92 has a pair of notches 100 and 102, which are adapted to respectively cooperate with miniature movement switches 104 and 106 that are carried in frame 50. Switch 104 is a double-throw switch which controls energization of lamp 68. When switch 104 is in the position of FIGURE 13, then lamp 68 is lit. Upon any movement of shutter 92 away from the position of FIGURE 13, the lamp 68 is immediately extinguished. With switch 106 opened as shown in FIGURE 13, no photocopy activity will take place. When the aperture 98 is properly aligned with lens 80, then the switch 106 is closed, thereby preparing the electrical circuit of the machine for a timed exposure by the photocopy portion of the machine, as hereinafter described.

It will be understood that the viewing and illuminating means 26 hereinabove described merely provides a projected optical image at a pre-selected focal distance that is precisely spaced from an exposure station defined within the casing 12 of the photocopying device. It will be readily apparent that the photocopying device which is hereinafter described may be utilized with other optical systems, and the device will operate on the same principles, provided that the material to be copied is so optically arranged as to project the image to be copied from the selected optical focal position that is coordinated with the spacing of the focal point from the exposure station within the photocopier. Thus, while this specific machine provides for projecting the image of a microphotograph, full-size material may be arranged so that its optical projection uses the same focal distance, and thus the photocopier hereinafter described may be used with source material of any size.

Turning now to the photocopier portion of the machine, FIGURE 4 illustrates the focal station, or point, 110 from whence is projected the image that is to be copied onto a negative paper that is to be exposed at an exposure station in the machine. The frame 12 of the machine provides an aperture 112 through which the illuminated image is optically projected into the interior of the hollow casing 12. The casing 12 provides upper and lower hoizontal walls 114 and 116, which merge, respectively, with inclined walls 118 and 120 that respectively bound the upper and low boundaries of the optical projection from focal point 110. As best seen in FIGURE 3, the casing 12 also provides diverging inner side walls 122 and 124. These inner walls 118, 120, 122, and 124 are spaced from the outer walls of the casing 12 to define spaces, or chambers, in which are located the various operated mechanisms hereinafter described. The casing 12 also provides an internal vertical wall 126, which is spaced forwardly of the rear door 28, to define a space 128 in which is positioned a roll of highly-light-sensitive negative paper.

The rear edge of casing 120 is provided with light-trap grooves, or recesses, 130. The rear door 28, as shown in FIGURES 19 and 4A, is provided with elongated boss, or tongue, elements 132 which enter light-trap grooves 130 when the door 28 is closed, to provide a labyrinth which prevents stray light from entering into the interior of the light-proof chamber defined within casing 12.

The casing 12 provides a pair of upstanding ears 134 to which the rear door 28 pivotally attaches. The door 28, as best seen in FIGURE 19, is a generally hollow body having a rear wall 28a and spaced lateral sides 136 through which extend pins 138, as seen in FIGURE 19A, providing for pivotal connection between the door 28 and ears 134. On the rear wall 28a are a pair of roller-mounting flanges 140 which journal a roller shaft 142 that carries thereon a drive roller 144 and its associated drive gear 146. Projecting from adjacent the lower edge of wall 28a are a pair of roll-mounting flanges 148 that have inwardly-extending center bosses 150 which provide means for mounting thereon a roll of highly-light-sensitive negative paper at the negative-paper station. The flanges 148 are sufficiently resilient to be spread apart for entrance of the roll of paper therebetween. A guide bar 152, spaced from bosses 150, extends between the flanges 148 and is positioned in closely spaced relation to wall 28a. The bar 152 may be rotatable, but in the form shown it is stationary and is formed of a plastic material sold under the trademark Nylon, and it is adapted to have the negative paper trained therearound, as seen in FIGURE 4, as the paper is drawn off the roll of negative paper to be disposed at the exposure station of the machine.

Positioned outwardly of the flanges 148 are spring-grip clips 154 which are adapted to cooperate with studs 156 that are carried on the casing, it being understood that the clips 154 and studs 156 provide for simple frictional retention of the door 28 in its closed condition. Mounted on wall 28a are a pair of elongated guide flanges 158 of a transparent material so as not to interfere with the projected image, and having guide-edge portions which project toward each other and which are spaced from the wall 28a. The web of negative paper that is drawn from the negative roll has only its marginal portions pass underneath the flanges 158, and the negative paper is thus held against the wall 28a at the exposure station.

The interior of the casing as thus defined provides a light-tight chamber 159 that is fully closed off when the door 28 is in its closed position, as seen in FIGURE 4. The walls 122 and 124 which laterally bound the light-tight chamber 159 are recessed, as best seen in FIGURES 3 and 4, to provide a roll-entering passageway that is bounded in part by a horizontal wall, or surface, 160 and by an upwardly curving wall 162. The upwardly curving wall 162 leads to a roll-receiving recess 164 that is formed above the plane of wall 118 and which defines a positive-paper station and into which a roll of positive paper is to be inserted. The side walls of casing 12 which bound recess 164 carry resilient roll-centering bosses 166, one of which is seen in FIGURE 4, and it will again be understood that the bosses 166 may be spread laterally to afford selective entry of a roll of paper therebetween. Because of the presence of recess 164, the inner casing wall 118 is interrupted, but the casing 12 also provides a curved wall portion 118a that partially bounds recess 164, a straight wall portion 118b which is a projected extension of wall 118, and a further extended projection 118c which terminates at a rounded tip 118d which is spaced closely adjacent the wall 28a of the rear door.

The negative paper roll is designated by numeral 170, and the web that is drawn off the roll is designated 170a. The positive paper roll is 171 and the web drawn therefrom is 171a. A shield 172 for the negative roll is provided having a mounting leg 172a secured to wall 126 and providing a cantilevered leg 172b which projects toward wall 28a and which overlies the negative roll 170 and roller 152. The shield 172 prevents stray light from inadvertently exposing the highly-light-sensitive negative paper. The flexibility of leg 172b permits of the entrance of roll 170 therebeneath. A shield 173 secured in spaced relation to wall 118b and substantially coextensive therewith provides a shielded guideway and support for positive web 171a.

A first means for advancing the webs of negative and positive paper from their respective rolls and stations is provided by a first drive roller 144 carried by door 28, and a second drive roller 176 that is mounted on a shaft 178 whose ends are journaled in a pair of bell cranks 180 that are mounted for pivoting about the axis of pivot pins 182, as seen in FIGURE 7. Shaft 178 carries gear 178a for meshing with gear 146. Each bell crank 180 provides a cam arm 184, a portion of which is positioned to be engaged by a severing means that is hereinafter described, and a spring 186 has one leg 188 thereof anchored to a portion of the frame while the other leg 190 biases the bell crank 180 so as to force the drive roller 176 against the drive roller 144.

The negative paper web 170a extends from bar 152 upwardly past the exposure station to the bite of the drive rollers 144 and 176, and the positive paper web 171a extends along the under side of walls 118b and 118c around the tip 118d to the bite between drive rollers 144 and 176, so that the negative paper web and positive paper web move in unison between the rollers 144 and 176. As the two webs emerge from between rollers 144 and 176 they are separated by an elongated paper separator 192, with the negative paper passing above separator 192 and the positive paper passing below separator 192. The separator 192 is mounted at its ends only and has a pointed rear edge 194 to assist in separation of the webs, a flat under side, and a downwardly curved upper surface 196 adjacent the forward edge.

Spaced below the positive web and the forward edge of separator 192 is a pivotally mounted, elongated anvil bar 198 having a cutting edge 198a that is sloped, or skew, relative to the pivot axis of the anvil, as can best be seen in the plan view of FIGURE 17. The skew is very small and is in the range of about $\frac{1}{32}$ inch in the overall length of about nine inches of the anvil bar 198. The anvil bar 198 is carried on an elongated support 199 that has downwardly extending support arms 200 which are pivotally mounted on spaced, coaxial pivot pins 202, and support 199 is biased forwardly by four coil springs 204 which are seated in recesses 206 formed in a frame member.

A guillotine-type, vertically guided, cutter 208 is provided normally spaced above the negative paper web as the web advances from the paper separator 192. The cutter 208 provides a sharp, upwardly inclined cutting edge 210 which is adapted for cooperation with the cutting edge 198a of the anvil. A downwardly extending tongue 212, adjacent the lowermost portion of edge 210, projects forwardly of cutting edge 210 and engages a part of the forward edge of the anvil 198 when the cutter edges are spaced apart, so that the springs 204 serve to bias the anvil 198 against the tongue 212. The cutter 208 provides a pair of arms 214 located laterally outwardly of the anvil 198 and to which are connected articulated link rods 216, by means of which the cutter is selectively actuated.

The cutter 208 also provides adjacent the upper edge thereof a pair of cam actuators 217 positioned to engage the cam arms 184 of bell cranks 180. Thus, when the cutter edge 210 effects severing of the paper webs, the bell cranks 180 are pivoted against the bias of springs 186 to separate roller 176 from roller 144 while still maintaining partial meshing of gears 146 and 178a. In the cutting operation both webs 170a and 171a must be brought into cutting engagement with anvil 198. The rounded edge 196 of separator 192 and the separating of rollers 144 and 176 permits of the necessary movement of web 170a against anvil 198 (as seen in FIGURE 6) to provide for clean severing of the webs. The inherent resilience of web 170a coupled with said separation of roller 176 from roller 144 permits web 170a to re-align itself after the severing operation for further movement through the machine, as hereinafter described.

As the spaced negative and positive paper webs, or segments thereof, leave the severing station defined by the cutter 208 and the anvil 198, the webs are engaged by spaced rollers 218 and 220 which are positioned above and below an elongated divider member 222. The rear portion 224 of web divided 222 is specifically formed of Teflon, and is adapted to have the paper webs pressed thereagainst by the paper advancing rollers 218 and 220. It has been found that it is very important that the part 224 be of Teflon in order to obtain the desirable paper-advancing characteristics. The rollers 218 and 220 are carried respectively on shafts 218a and 220a, which are appropriately journaled in frame members of the casing. The shafts 218a and 220a carry meshing drive gears 218b and 220b.

As the paper web segments advance past the rollers 218 and 220, they are caused to enter a developing station, whereat is provided a liquid developer chemical bath through which the negative and positive paper segments pass to be wetted by a chemical that brings about development of the image that has been photographically produced on the negative paper. At the developing station there is provided a plastic container 226 for containing therein the chemical bath. The details of the container and of the parts therein are best seen by reference to FIGURES 4 and 15. The plastic container 226 has an inclined bottom 228 which lies against wall 118b, a stepped shallow end 230 with an abutment flange 232 that has therein a pair of notches, or apertures, 234, and an upright side wall 236 adjacent the deep end of the container that is curved to cooperate with the curved wall 118a of the casing.

A first guide and paper separator 238 that is positioned in container 226 includes a channel-shaped first abutment member 240 lodged in the deep corner of the container 226, a plurality of similarly shaped and parallel wire members 242 which extend between abutment 240 and a transverse wire 244, and a pair of hook members 246 that extend rearwardly of wire 244 and which are adapted to enter notches 234 to engage the under side of abutment flange 232. The wire members 242 provide for resilient selective mounting of body 238 in container 226. Secured to bar 244 in spaced parallel relation thereabove is a divider bar 248 from whence extend a second plurality of similarly shaped and parallel wires 250 which are shorter in length than the wires 242 and are spaced thereabove. The wires 242 provide a lowermost guide surface for engaging and supporting the positive paper, and the wires 250 form a second, or intermediate, guide surface for engaging and supporting the negative paper in spaced relation above the positive paper. The divider bar 248 insures that the negative and positive paper enter their respective guideways.

A second guide and separator body, indicated generally at 252 and for selective assembly in container 226, provides a pair of spaced support wires 253 that enter the container 226 adjacent the side walls thereof, a splash panel 254 of transparent plastic supported by the ends of support wires 253 above container 226, and a plurality of depending similarly shaped and parallel guide wires 256 that are supported from panel 254 and are spaced above the wires 250 to thereby form a third guide surface which confines the negative paper into the passageway between the wires 254 and the wires 250. The support wires 253 are shaped to define toes 253a, which engage the abutment member 242, and heels 253b which cooperate with the shape of the container 228 to restrain body 252 from longitudinal movement within the container 226.

After the segments of positive and negative paper pass through the developing station and emerge from the chemical bath within container 226, the segments of paper are caused to move together between the bite of a pair of pressure, or squeegee, rollers which operate to firmly press the two wet sheets of paper together to obtain intimate contact therebetween and to squeeze out excess solution from the papers. To that end, the machine is provided with a pair of pressure rollers 258 and 260 mounted respectively on shafts 262 and 264, and which shafts carry thereon meshing drive gears 266 and 268. A stud drive gear 270 is provided in mesh with gear 268 and carried by a stub shaft 271 on which there is a drive sprocket 272. The shaft 271 is supported on a frame member that is secured to the casing. As seen in FIGURE 8, the shaft 262 is disposed in elongated journal holes 276, which permits of limited spreading movement between the pressure rollers 258 and 260. The roller 258 is normally biased toward roller 260 by pressure means that include elongated pins 278 which engage shaft 262 and which are spring biased by leaf springs 280.

The rollers 258 and 260, their support shafts, bearings and gears, are all arranged as a sub-assembly on a frame means generally indicated at 282. This sub-assembly permits removal thereof from the machine for purposes of cleaning and the meshing connection of gear 270 with gear 268 permits separation thereat. It will be understood that since the squeegee rollers 258 and 260 come in direct contact with the chemical from the developing station, there is the necessity of effecting periodic cleaning of the parts exposed to the chemicals. To secure the sub-assembly 282 in position on the machine, the frame 282 is provided with ears 284 having pin-receiving apertures 286 adapted to receive therein locking pins that are carried by other portions of the casing. The sub-assembly 282 also provides an elongated guide flange 290 which is spaced slightly above the bite between the squeegee rollers 258 and 260 and which is positioned to receive the sandwich of pressed-together positive and negative paper and to direct the sandwich of such paper to a receiving station 292, that is closed off by the movable cover 38.

Referring now to the drive means for the cutter means 208, as best seen in FIGURE 4, there is provided a rock shaft 294 from which extend a pair of arms 296 and 298 that pivotally connect to the articulated rods 216. The arm 296 is part of a motor-driven bell crank that has an elongated slot 300 in which is positioned a driver 302 carried by a rotatably mounted drive arm 304 that is driven through the shaft 306 of a single-rotation motor 308. When motor 308 rotates a single turn, the mechanical arrangement causes the cutter blade 210 to move downwardly from an elevated position past the anvil 198 and to then return to said elevated position.

FIGURE 19A shows how the cover 36 is pivotally mounted on a boss 28b defined on the rear door 28. The pin 138 is provided with a headed portion 138a which retains the cover 36 in operative position relative to door 28.

FIGURE 18 diagrammatically illustrates the drive means for the various portions of the machine hereinabove described. A first drive chain 312 is trained over a sprocket 314 driven by a paper-pull motor 315, and passes over idler-and-takeup sprockets 316 and 318, and effects a driving connection with a sprocket 320 on shaft 178. The rollers 176 and 144 are caused to rotate simultaneously in opposite directions by means of meshing gears 146 and 178a carried respectively on shafts 142 and 178. A second drive chain 322 is driven by a sprocket 324 that is rotated by squeegee motor 325. The chain 324 passes over an idler and takeup sprocket, or roller, 326 and then operates to drive a sprocket 328 carried on shaft 218a and sprocket 272 on shaft 271. The rollers 218 and 220 are caused to rotate simultaneously and in opposite directions by means of meshing gears 218b and 220b carried respectively on shafts 218a and 220a; and the squeegee rollers 258 and 260 rotate synchronously and oppositely through the means of meshing gears 266 and 268.

A movement-measuring means is provided as illustrated diagrammatically by a movement-measuring wheel, or sprocket, 330 that is meshed with the drive chain 312, and through a gear train including small sprocket 332, chain 334, and sprocket 336, operates to measure the amount of paper web that is moved by the rollers 144 and 176. The said movement-measuring, or paper-measuring, means is utilized to actuate a number of controls and switching means, including terminating further movement of the paper webs by rollers 144 and 176. A typical control arrangement is illustrated in FIGURE 18 as utilizing a cam finger 338 carried on the shaft 337 of sprocket 336 and positioned to engage and actuate a miniature-movement switch, MS.

The wiring arrangement shown in FIGURE 20 will assist in explaining the desired sequence of operation of the device thus described. The system is energized through leads 400 and 402, and lead 400 having therein an on-off switch 404 and a fuse 406. A pilot light 408 is provided containing therein a current-limiting resistor. Light 408 shows when the on-off switch 404 is closed. A double-throw miniature-movement switch 104 has a normally closed contact 104a and a normally open contact 104b. Closed contact 104a energizes transformer 410 to illuminate lamp 68 when the machine is used for viewing. A timer T is provided having a push button T¹ for initiating a photocopying cycle. The timer T is provided with a motor 412 whose movement is controlled by a normally open switch 414 that is adapted to be closed by a circuit relay 416. A second normally open switch 414a is also closed by energization of relay 416. The paper-pull motor 315 is in two circuits, one having a normally open switch 418 and the other having switch 414 and a normally open switch 424b. The cutter motor 308 is in two circuits, one with a normally open switch 420, and the other with a normally open switch 422b. The switch 422b is the second throw of a double-throw switch that includes a normally closed contact 422a. The switch 424b is the second throw of a double-throw switch 424 that includes a normally closed contact 424a. A normally closed switch 426 is in circuit with the squeegee motor 325. The normally open switch 106 controlled by shutter member 92 is in circuit with a pilot light 430 and with the spring-returned by-passing timer switch T¹.

When the switch 404 is closed, and when switch 104a is closed, as when the parts are in the position of FIGURE 13, then the lamp 68 is lit, which permits of viewing of the microphotograph. As soon as the shutter member 92 is moved a slight distance away from the position of FIGURE 13, the contact 104a opens and the contact 104b closes, and this immediately cuts off the light 68. When the timer begins, switch 424a is closed. When the timed period ends, switch 424a opens and 424b closes. With shutter member 92 in the position for copying, switch 106 is closed, illuminating pilot light 430. By closing timer switch T¹ relay 416 is energized which closes switches 414 and 414a, the latter closing a holding circuit through relay 416. A closed circuit is then established through switch 414, switch 424a, and switch 104b, to illuminate the light 68. When the timer times out, the switch 424a is opened and the switch 424b is closed, and this de-energizes the light 68 terminating exposure of the negative paper at the exposure station. With switch 424b closed, the motor 315 is energized, thereby advancing the positive and negative paper through rollers 144 and 176.

The switches 418 and 420 are arranged to be actuated by the paper-measuring means and switch 418 closes just prior to the closure of switch 420. Switches 418 and 420 open a very short time later after the cutter motor 308 has begun movement. Switch 422 is actuated simultaneously with movement of cutter motor 308 and operates to close 422b and to open 422a. When switch 422a opens the holding circuit to relay 416 is open, and switches 414 and 414a open. Very shortly thereafter, the switches 420 and 418 are opened respectively in sequence by slight additional movement of the paper-measuring means. At the same time, the switch 422 is maintained closed until the motor 308 has gone through one full revolution. The switch 426 is arranged to be opened substantially simultaneously with the closure of switch 422, and switch 426 reopens after the motor 308 has gone through only half a revolution. Upon completion of the single revolution of motor 308 the switch 422 is opened and the switch 422a is closed, thereby restoring the circuit to the original condition illustrated in FIGURE 20, and the machine is ready for another cycle.

In terms of actual operation, what occurs in the device is that when button T¹ is pressed there is provided a timed exposure of the matter to be copied, during which time the light from the matter to be copied is projected onto the web of negative paper that is held against the wall 28a. At the end of the timed exposure period, the light 68 goes out and the rollers 144 and 176 begin to rotate, advancing the webs past the severing means. The rollers 218 and 220 are already rotating by reason of movement of motor 325, and the speed of the rollers 218 and 220 and of rollers 144 and 176 is the same. As the webs are advanced by the rollers, the paper-measuring means is measuring the amount of paper that is being advanced, and when sufficient paper has been advanced to insure that the exposed segment of negative paper has moved beyond the severing means, the cutter 208 starts to move downwardly. The rollers 144 and 176 continue to move a very short distance after the cutter 208 starts downwardly, whereupon further movement of motors 315 and 325 is terminated. The cutter 208 continues downward movement and severs segments from the webs of negative and positive paper only while the paper is stationary. At the end of the downward severing stroke, the motor 325 resumes operation and the severed segments of negative and positive paper proceed automatically through the developing station and through the squeegee rollers to be deposited in receiving station 292. When the cutter 208 is restored to its uppermost position, the machine is ready to start another cycle of copying, advancing of paper, and severing.

While there has been shown and described a particular embodiment of this invention, it will be obvious to those skilled in the art that various changes and modifications may be made therein without departing from the invention, and therefore, it is intended in the appended claims to cover all such changes and modifications as fall within the true spirit and scope of the invention.

What we claim as new, and desire to secure by Letters Patent of the United States, is:

1. A photocopying machine comprising, in combination, hollow casing means defining an enclosed and light-shielded exposure station, means for projecting an illuminated image of material to be copied through said hollow casing means toward said exposure station, a continuous roll of relatively highly-light-sensitive negative paper within said casing disposed closely adjacent said exposure station, the negative paper being drawn off said roll to have a segment thereof positioned for exposure at said exposure station, a continuous roll of relatively less-light-sensitive positive paper within said casing, a segment of the positive paper being drawn off said positive paper roll that is exposed to the portion of the interior of said hollow casing through which said illuminated image is projected but said positive paper segment being trained over a path located outwardly of the projected image of material to be copied, said segment of positive paper being arranged to be disposed in facing, complementary, relationship with the exposed segment of negative paper, paper-engaging means for simultaneously advancing the exposed segment of negative paper and a complementary segment of positive paper past a severing station, means for severing both the exposed segment of negative paper and complementary segment of positive paper from their respective webs after said segments have been advanced past said severing station, second paper-engaging means located on the discharge side of said severing station for engaging and advancing the segments of paper from the severing station toward a developing station at which chemical photocopy-developing means are caused to engage the segments of paper, and chemical photocopy-developing means arranged to be engaged by said paper segments after the segments have passed said severing station and cooperating with said paper segments for chemically developing a positive photocopy on said positive paper segment.

2. A photocopying machine comprising, in combination, means defining an exposure station, a paper-severing station spaced from said exposure station, and a photocopy developing station spaced from said severing station; a negative paper station; a positive paper station spaced from said negative paper station; first paper-engaging means between said exposure station and said severing station for advancing complementary continuous webs of negative and positive paper from said paper stations past said severing station; severing means at said severing station for severing complementary segments of both negative and positive paper from said continuous webs; and second paper-engaging means located between said paper-severing station and said photocopy-developing station for engaging and advancing the severed complementary segments of negative and positive paper toward and into said photocopy developing station.

3. A photocopying machine comprising, in combination, means defining an exposure station, a paper-severing station spaced from said exposure station, and a photocopy developing station spaced from said severing station; a negative paper station; a positive paper station spaced from said negative paper station; first paper-engaging means between said exposure station and said severing station for advancing complementary continuous webs of negative and positive paper from said paper stations past said severing station; severing means at said severing station for severing complementary segments of both negative and positive paper from said continuous webs; second paper-engaging means located between said paper-severing station and said photocopy-developing station for engaging and advancing the severed complementary segments of negative and positive paper toward and into said photocopy developing station; and sequence means for first exposing a web portion of negative paper that is stationarily positioned at the exposure station, for then causing the first paper-engaging means to advance the exposed web portion of negative paper and a complementary web portion of positive paper simultaneously past the severing means, for then severing the segment of exposed negative paper and complementary segment of positive paper from the respective webs, and for then causing the second paper-engaging means to advance the severed segments in unison through said developing station.

4. A photocopying machine comprising, in combination, means defining an exposure station, a paper-severing station spaced from said exposure station, and a photocopy developing station spaced from said severing station; a negative paper station; a positive paper station spaced from said negative paper station; first paper-engaging means between said exposure station and said severing station for advancing complementary continuous webs of negative and positive paper from said paper stations past said severing station; severing means at said severing station for severing complementary segments of both negative and positive paper from said continuous webs; second paper-engaging means located between said paper-severing station and said photocopy developing station for engaging and advancing the severed complementary segments of negative and positive paper toward and into said photocopy developing station; casing means enclosing said exposure station and negative paper station to normally shield unexposed negative web from light, said negative paper station being located immediately adjacent said exposure station, so that only a very small segment of negative web need extend from and is exposed between the negative paper station and the exposure station, and means carried by said casing means for selectively projecting an illuminated image of material to be copied onto the negative web at the exposure station for a limited time.

5. A photocopying machine comprising, in combination, means defining an exposure station, a paper-severing station spaced from said exposure station, and a photocopy developing station spaced from said severing station; a negative paper station; a positive paper station spaced from said negative paper station; first paper-engaging means between said exposure station and said severing station for advancing complementary continuous webs of negative and positive paper from said paper stations past said severing station; severing means at said severing station for severing complementary segments of both negative and positive paper from said continuous webs; means for spacing apart the positive and negative paper segments after they pass said first paper-engaging means and before the segments pass into the photocopying developing station; and second paper-engaging means located between said paper-severing station and said photocopying-developing station for advancing the severed complementary segments of negative and positive paper toward and into said photocopy developing station.

6. A photocopying machine comprising, in combination, means defining an exposure station, a paper-severing station spaced from said exposure station, and a photocopy developing station spaced from said severing station; a negative paper station; a positive paper station spaced from said negative paper station; first paper-engaging means between said exposure station and said severing station for advancing complementary continuous webs of negative and positive paper from said paper stations past said severing station; severing means at said severing station for severing complementary segments of both negative and positive paper from said continuous webs; second paper-engaging means located between said paper-severing station and said photocopy-developing station for engaging and advancing the complementary segments of negative and positive paper toward and into said photocopy developing station; and means defining an optical focal station spaced a pre-determined distance from the exposure station and from whence an illuminated image of material to be copied is to be projected toward said exposure station; and light means for selectively illuminating material to be copied and for projecting an illuminated image of such material through said focal station toward said exposure station.

7. A photocopying machine comprising, in combination, means defining an exposure station, a paper-severing station spaced from said exposure station, and a photocopy developing station spaced from said severing station; a negative paper station; a positive paper station spaced from said negative paper station; casing means enclosing said exposure station to normally shield unexposed negative web from light, a first recess in said casing means positioned adjacent the exposure station and adapted to receive therein a roll of negative paper from which a web of negative paper may be led directly to said exposure station, and a second recess in said casing spaced from the exposure station and adapted to receive therein a roll of positive paper from which a web of positive paper may be drawn into engaging juxtaposition with the web of negative paper after it leaves said exposure station; first paper-engaging means between said exposure station and said severing station for advancing complementary continuous webs of negative and positive paper from said paper stations past said severing station; severing means at said severing station for severing complementary segments of both negative and positive paper from said continuous webs; means for spacing apart the positive and negative paper segments after they pass said first paper-engaging means and before said segments are cut from the webs; and second paper-engaging means located between said paper-severing station and said photocopy-developing station for engaging and advancing the complementary segments of negative and positive paper toward and into said photocopy developing station.

8. A photocopying machine comprising, in combination, means defining an exposure station, a paper-severing station spaced from said exposure station, and a photocopy developing station spaced from said severing station; means defining an optical focal station spaced from the exposure station and from whence an illuminated image of material to be copied is projected toward said exposure station; casing means enclosing and shielding from light the exposure station and the space through which the illuminated image is projected between said focal station and said exposure station; said casing means defining a pair of opposed sides which substantially parallel the boundaries of the projected image and which diverge in the direction moving toward the exposure station; a first recess in said casing means positioned adjacent the exposure station and adapted to receive therein a roll of negative paper from which a web of negative paper may be led directly to said exposure station; a second recess in said casing spaced from the exposure station and adapted to receive therein a roll of positive paper from which a web of positive paper may be drawn into engaging juxtaposition with the web of negative paper after it leaves said exposure station; first paper-engaging means between said exposure station and said severing station for advancing complementary continuous webs of negative and positive paper from said paper stations past said severing station; severing means at said severing station for severing complementary segments of both negative and positive paper from said continuous webs; means for spacing apart the positive and negative paper segments after they pass said first paper-engaging means and before the segments pass into the photocopy developing station; and second paper-engaging means located between said paper-severing station and said photocopy-developing station for engaging and advancing the complementary segments of negative and positive paper toward and into said photocopy developing station.

9. A photocopying machine comprising, in combination, means defining an exposure station, a paper-severing station spaced from said negative-exposure station, and a photocopy developing station spaced from said severing station; a negative paper station; a positive paper station spaced from said negative paper station; first paper-engaging means between said exposure station and said severing station for advancing complementary continuous webs of negative and positive paper from said paper stations past said severing station; severing means at said severing station for severing complementary segments of both negative and positive paper from said continuous webs; means for spacing apart the positive and negative paper segments after they pass said first paper-engaging means and before the segments pass into the photocopy developing station; second paper-engaging means located between said paper-severing station and said photocopy-developing station for advancing the complementary segments of negative and positive paper toward and into said photocopy developing station; and means for stopping advancing movement of said paper-engaging means while said severing means is being actuated.

10. A photocopying machine comprising, in combination, means defining an exposure station, a paper-severing station spaced from said exposure station, and a photocopy developing station spaced from said severing station; a negative paper station, a positive paper station spaced from said negative paper station; first paper-engaging means between said exposure station and said severing station for advancing complementary continuous webs of negative and positive paper from said paper stations past said severing station; severing means at said severing station for severing complementary segments of both negative and positive paper from said continuous webs; second paper-engaging means located between said paper-severing station and said photocopy-developing station for advancing the complementary segments of negative and positive paper toward and into said photocopy developing station; and means for spacing apart the positive and negative webs after they pass said first paper-engaging means and before said segments are cut from the webs.

11. A photocopying machine comprising, in combination, means defining an exposure station, a paper-severing station spaced from said exposure station, and a photocopy developing station spaced from said severing station; a negative paper station; a positive paper station spaced from said negative paper station; first paper-engaging means between said exposure station and said severing station for advancing complementary continuous webs of negative and positive paper from said paper stations past said severing station; anvil and cutter means at said severing station for simultaneously severing complementary segments of both negative and positive paper from said continuous webs; and second paper-engaging means located between said paper-severing station and said photocopy-developing station for engaging and advancing the complementary severed segments of negative and positive paper toward and into said photocopy developing station.

12. A photocopying machine comprising, in combination, means defining an exposure station, a paper-severing station spaced from said exposure station, and a photocopy developing station spaced from said severing station; a negative paper station; a positive paper station spaced from said negative paper station; first paper-engaging means between said exposure station and said severing station for advancing complementary continuous webs of negative and positive paper from said paper stations past said severing station; severing means at said severing station for severing complementary segments of both negative and positive paper from said continuous webs; means for spacing apart the positive and negative webs after they pass said first paper-engaging means and before the segments are cut from the webs; and second paper-engaging means spaced from said first paper-engaging means for engaging the complementary severed positive and negative segments and for simultaneously advancing said complementary segments toward and into said photocopy developing station.

13. A photocopying machine comprising, in combination, means defining an exposure station, a paper-severing station spaced from said exposure station, and a photocopy developing station spaced from said severing station; a negative paper station, a positive paper station spaced from said negative paper station; first paper-engaging means between said exposure station and said severing station for advancing complementary continuous webs of negative and positive paper from said paper stations past said severing station; severing means at said severing station for severing complementary segments of both negative and positive paper from said continuous webs, means for spacing apart the positive and negative webs before the segments are cut from the webs; second paper engaging means for separately engaging the spaced complementary positive and negative segments and for simultaneously advancing the complementary segments through said photocopy developing station, said second paper-advancing means including an elongated paper separator positioned to be disposed between the spaced positive and negative paper segments, and a pair of friction rollers cooperating with opposite sides of said paper separator.

14. A photocopying machine comprising, in combination, means defining an exposure station, a paper-severing station spaced from said exposure station, a photocopy developing station spaced from said severing station, and a receiver station spaced from said developing station for receiving the developed photocopy from said developing station; a negative paper station; a positive paper station spaced from said negative paper station; first paper-engaging means between said exposure station and said severing station for advancing complementary continuous webs of negative and positive paper from said paper stations past said severing station; severing means at said severing station for severing complementary segments of both negative and positive paper from said continuous webs; second paper-engaging means for advancing the complementary segments of negative and positive paper toward and into said photocopy developing station; and pressurized squeeze-and-advancing rollers located between said developing station and said receiver station for receiving the positive and negative paper segments from said developing station and for pressing said segments together while advancing the pressed-together paper segments to the receiver station.

15. A photocopying machine comprising, in combination, means defining an exposure station, a paper-severing station spaced from said exposure station, and a photocopy developing station spaced from said severing station; a negative paper station; a positive paper station spaced from said negative paper station; first paper-engaging means between said exposure station and said severing station for advancing complementary continuous webs of negative and positive paper from said paper stations past said severing station; severing means at said severing station for severing complementary segments of both negative and positive paper from said continuous webs; second paper-engaging means for advancing the complementary segments of negative and positive paper through said photocopy developing station; and said first paper-engaging means including a pair of rollers which are spring biased together to grip both paper webs therebetween to advance said paper webs, and means operative simultaneously with said severing means for separating said pair of rollers of said first paper-engaging means, to permit said webs to re-align themselves after the severing operation.

16. A photocopying machine comprising, in combination, means defining an exposure station, a paper-severing station spaced from said exposure station, and a photocopy developing station spaced from said severing station; a negative paper station; a positive paper station spaced from said negative paper station; first paper-engaging means between said exposure station and said severing station for advancing complementary continuous webs of negative and positive paper from said paper stations past said severing station; severing means at said severing station for severing complementary segments of both negative and positive paper from said continuous webs; second paper-engaging means for advancing the complementary segments of negative and positive paper through said photocopy developing station; and said first paper-engaging means including a pair of rollers which are spring biased together to grip both paper webs therebetween to advance said paper webs, one of said rollers being mounted on a bell crank and resiliently biased toward the other roller, and cam means movable with said severing means to actuate said bell crank to swing said one roller away from the other roller to release the paper webs between the bite of said rollers.

References Cited by the Examiner
UNITED STATES PATENTS

| | | | |
|---|---|---|---|
| 1,064,009 | 6/1913 | Robertson et al. | 83—583 |
| 2,130,473 | 9/1938 | Ruau | 83—583 |
| 2,186,637 | 1/1940 | Green et al. | 95—94 |
| 2,516,398 | 7/1950 | Land et al. | 95—13 |
| 2,582,001 | 1/1952 | Bornemann et al. | |
| 2,652,759 | 9/1953 | Bornemann | 95—94 |
| 2,735,335 | 2/1956 | Shaw | 88—24 |
| 2,751,814 | 6/1956 | Limberger | 88—24 |
| 2,759,404 | 8/1956 | Bishop et al. | 95—13 |
| 2,763,772 | 9/1956 | Hine | 240—1.3 |
| 2,923,812 | 2/1960 | Hauptvogel | 240—1.3 |
| 3,076,400 | 2/1963 | Limberger | 95—75 |

NORTON ANSHER, *Primary Examiner.*

EMIL G. ANDERSON, *Examiner.*